US012773724B2

(12) United States Patent
Fan et al.

(10) Patent No.: US 12,773,724 B2
(45) Date of Patent: Oct. 27, 2026

(54) CONTAINER-TYPE PHOTOVOLTAIC MODULE RECYCLING DEVICE

(71) Applicant: YC SOLUTION (SUZHOU) TECHNOLOGY CO., LTD., Suzhou (CN)

(72) Inventors: Weitao Fan, Suzhou (CN); Xin Zhang, Suzhou (CN); Junlin Huang, Suzhou (CN)

(73) Assignee: YC SOLUTION (SUZHOU) TECHNOLOGY CO., LTD., Suzhou (CN)

(*) Notice: Subject to any disclaimer, the term of this patent is extended or adjusted under 35 U.S.C. 154(b) by 14 days.

(21) Appl. No.: 19/091,231

(22) Filed: Mar. 26, 2025

(65) Prior Publication Data

US 2025/0222498 A1 Jul. 10, 2025

Related U.S. Application Data

(63) Continuation of application No. PCT/CN2024/117897, filed on Sep. 10, 2024.

(30) Foreign Application Priority Data

Nov. 17, 2023 (CN) ......................... 202311532158.9

(51) Int. Cl.
*B09B 3/30* (2022.01)
*B09B 3/40* (2022.01)
*B09B 101/15* (2022.01)

(52) U.S. Cl.
CPC .................. *B09B 3/30* (2022.01); *B09B 3/40* (2022.01); *B09B 2101/15* (2022.01)

(58) Field of Classification Search
CPC ......... B09B 2101/15; B09B 3/00; B09B 3/30; B09B 3/40; B09B 5/00; Y02W 30/82
See application file for complete search history.

(56) References Cited

U.S. PATENT DOCUMENTS

2022/0184939 A1 6/2022 Kim
2025/0222498 A1* 7/2025 Fan .......................... B09B 5/00

FOREIGN PATENT DOCUMENTS

CN 102544239 A 7/2012
CN 110922228 A 3/2020
(Continued)

*Primary Examiner* — Sonya M Sengupta
(74) *Attorney, Agent, or Firm* — Dinsmore & Shohl LLP

(57) ABSTRACT

An aspect relates to a container-type photovoltaic module recycling device, which is provided including at least two sections of containers that are capable of being docked at their ends in a length direction, an articulating transfer apparatus located between two adjacent containers, a junction box removal apparatus, a frame removal apparatus, and a glass stripping apparatus. On the one hand, after on-site recycling is implemented, the cells recycled from a single photovoltaic module are about 10 g in weight, in addition, the cost of moving and transporting a device once, compared with the existing centralized recycling of loaded photovoltaic module, the transportation cost will be qualitatively reduced with strong flexibility and practicality; on the other hand, through docking and articulating transfer of containers, it is not limited by on-site levelness and height differences, once the containers are docked, recycling is performed in an on-site environment with inconsistent levelness.

20 Claims, 9 Drawing Sheets

(56) References Cited

FOREIGN PATENT DOCUMENTS

| | | | |
|---|---|---|---|
| CN | 111958352 | A | 11/2020 |
| CN | 116603836 | A | 8/2023 |
| CN | 117259386 | A | 12/2023 |
| CN | 118080521 | A | 5/2024 |
| CN | 118180105 | A | 6/2024 |

* cited by examiner

CONTAINER-TYPE PHOTOVOLTAIC MODULE RECYCLING DEVICE

CROSS-REFERENCE TO RELATED APPLICATIONS

This application is a continuation of international Application No. PCT/CN2024/117897, filed on Sep. 10, 2024, which claims priority to Chinese Application No. 202311532158.9, filed on Nov. 17, 2023, both of which are hereby incorporated by reference in their entireties.

TECHNICAL FIELD

The present disclosure belongs to the field of photovoltaic technology, and in particular relates to a container-type photovoltaic module recycling device.

BACKGROUND

As a novel power generation system, a photovoltaic generation system uses a photovoltaic effect of a semiconductor material for solar cells to directly convert a solar radiant energy into an electrical energy, and is capable of being operated in two modes, i.e., an independent operation mode and a grid-connected operation mode. A photovoltaic panel module is a type of power generation apparatus that generates direct current when exposed to sunlight, and is composed of thin solid photovoltaic cells made almost entirely of semiconductor materials (e.g., silicon). The photovoltaic panel module specifically includes glass panels, EVA adhesive layers, cells, back panels, junction boxes, and frames, wherein more than ninety percent of the materials can be recycled and reused with considerable recycling value and higher economic profit, therefore, the photovoltaic modules should be recycled at the end of their life cycle, thereby not only alleviating a shortage of raw materials for photovoltaic devices to a certain extent, but also avoiding pollution to the environment.

However, as to the existing mode of recycling photovoltaic modules, generally, the photovoltaic modules are firstly collected centrally, and then loaded and transported to a designated site before they are recycled one by one, therefore, this recycling mode has the following defects:

1) A single photovoltaic module itself is about 18-30 kg in weight, therefore, not only the number of photovoltaic modules is limited during recycling and transportation, but also the number of recycling and transportation will be increased, thereby leading to high recycling cost, low efficiency and other defects; however, after removal and stripping, the cells in a single photovoltaic module are 10-15 g in weight, so if the cells are directly recycled on site, then a qualitative change will happen during transportation; and
2) in a recycling process, a recycling device is generally placed horizontally on the ground, and a height difference exists between two adjacent processes and articulation is required. The recycling requirements are satisfied after removal through a whole set of processes, however, if the recycling device is placed on site, due to constraints of the on-site environment (difference in levelness and height), the problem of placement of the recycling device cannot be solved, therefore, recycling is simply impossible in case of inconsistent levelness, on-site recycling encounters an obvious technical obstacle, and development of on-site recycling of photovoltaic modules is also obstructed.

SUMMARY

The application provides an improved container-type photovoltaic module recycling device. A first aspect provides a container-type photovoltaic module recycling device includes a junction box removal apparatus, a frame removal apparatus, and a glass stripping apparatus, wherein the glass stripping apparatus includes an initial stripping unit, a re-stripping unit, and an articulating reversing unit, particularly, the glass stripping apparatus further includes a stripping pre-treatment unit located at a front end of the initial stripping unit, wherein the stripping pre-treatment unit includes a stress relief mechanism and a pre-heating mechanism, the stress relief mechanism is used for glass cracking or breaking under pressure, and the pre-heating mechanism softens an adhesive layer of the glass; the photovoltaic module recycling device further includes at least two sections of containers that are capable of being docked at their ends in a length direction, and an articulating transfer apparatus located between two adjacent containers, wherein the junction box removal apparatus and the frame removal apparatus are located in the same section of container, and each unit of the glass stripping apparatus is located in the remaining containers, a material opening is formed on a side of each container, the photovoltaic modules are sequentially and continuously subjected to junction box removal, frame removal, stripping pre-treatment, initial hob roller stripping, and re-eradication of residual glass through the articulating transfer apparatus, wherein the junction box, the frame, and the broken glass are respectively discharged from the material opening; and the cells are stored in corresponding containers or are discharged from the material opening.

In some embodiments, both sides of the container are wing-shaped and flipped around a length direction of the container to open or close, the removed junction box, frame, and broken glass are discharged from one side or both sides of a corresponding container, and cells are recycled in corresponding containers, to complete classified collection of each component, and after a wing door is unfolded, observation and manipulation at any time are also facilitated.

According to a specific embodiment and desired aspect of the present disclosure, a container has two sections, the junction box removal apparatus and the frame removal apparatus are located in the former section of the container, and the glass stripping apparatus is located in the latter section of the container, and during recycling, the two transportation trucks are aligned and spliced from the rear of the trucks, and the articulating transfer apparatus eliminates the drop between the former section and the latter section and guides and transfers the photovoltaic module, with removal of the junction box and the frame, to the stress relief mechanism. When two trucks are directly docked, the operation is very convenient, and is not affected by the on-site environment, and the adaptability is strong.

In some embodiments, the former section of the container has two sub-compartments, the junction box removal apparatus and the frame removal apparatus are sequentially arranged in the two sub-compartments, and both sides of each sub-compartment are formed with unfolded or closed wing doors, to satisfy respective requirements.

According to a specific embodiment and desired aspect of the present disclosure, the articulating transfer apparatus is located at a tail section of the former container or the latter container, an output end of the frame removal apparatus is located above an input end of the stress relief mechanism, and the articulating transfer apparatus includes a horizontally extending material receiving section, and a material guiding section arranged to be inclined from top to bottom, wherein a transfer material channel which gradually becomes small from the front to the back is arranged between the material receiving section and the material guiding section. Through the formation of the transfer material channel, docking is possible even if the road surface is level.

In some embodiments, both the material receiving section and the material guiding section are annular transmission belts. Annular transmission is more effective in eliminating height differences.

According to another specific embodiment and desired aspect of the present disclosure, the stress relief mechanism includes a transmission material channel docked with a transfer material channel, a lifting member capable of moving up and down and docking with the photovoltaic module from the transmission material channel, and an extruding breaking head located on the top, wherein the lifting member is lifted upwards after docking with the photovoltaic module and breaks the upper layer of glass under an extrusion in an up and down direction formed when the glass is fit with the extruding breaking head. Multi-point contact is allowed when an extruding mode is adopted, therefore, the breaking effect is favorable, and glass stripping in a later period is facilitated.

In some embodiments, the lifting member includes a telescopic cylinder and a bearing frame, wherein a supporting portion of the bearing frame is misaligned with the transmission material channel, such that the photovoltaic module is docked when the supporting portion emerges from a transmission surface of the transmission material channel. The photovoltaic module is lifted and descended by using a misaligned docking mode.

In some specific embodiments, a plurality of extruding breaking heads are available, and are arranged in an array on a bottom surface of the top base panel. Each extruding breaking head includes a fixed rod, and a breaking head located at the bottom of the fixed rod, wherein the breaking head gradually narrows from top to bottom and has a spherical bottom.

The resulting breaking pressure is optimal, thereby reducing the difficulty in stripping, and causing no damage to cells.

According to a further specific embodiment and desired aspect of the present disclosure, the pre-heating mechanism includes a heating furnace and a heating roller, wherein the heating roller forms a transmission surface, and the temperature formed in the heating furnace is 80-120° C. Generally, a temperature of 90±2° C. is sufficient. The role of preheating is to destroy the stress of the adhesive film and glass, such that the glass is easier to fall off.

According to a further specific embodiment and desired aspect of the present disclosure, the photovoltaic module recycling device further includes a back panel removal apparatus docked with the re-stripping unit, wherein the back panel removal apparatus includes a transmission unit, and a grinding unit located above a transmission surface formed by the transmission unit, wherein the grinding unit performs wet grinding. When a back panel is removed using wet grinding, environmental pollution and toxicity and other phenomena will not be caused by gasification of fluorine-containing components, and mixing of materials caused by back panel residues is also avoided, thereby further enhancing the purity of the recycled silicon.

In some embodiments, the grinding unit includes a plurality of grinding groups located above the transmission surface formed by the transmission unit and arranged side by side, and each grinding group includes a grinding tool and a cooling tool, wherein the grinding tool is a grinding wheel and/or an abrasive belt grinding member, and the cooling tool is cooling through water flow flushing.

In some specific embodiments, the transmission unit includes an annular transmission belt assembly, and an internally supported transmission roller located at the grinding place, wherein the cooling tool is arranged corresponding to the internally supported transmission roller, and the cooling tool includes a water pipe located above the annular transmission belt assembly, high-pressure nozzles distributed at intervals on the water pipe along a length direction of the water pipe, and a cooling liquid pressurized supply member, wherein the high-pressure nozzles face downwards and are inclined towards the grinding place, and a component force of the sprayed water flow in a vertical direction constitutes a downward positive pressure to fit and press the cells against the annular transmission belt assembly and grind and transmit under the transmission of the annular transmission belt assembly, thereby also effectively assisting in grinding during the cooling process.

In addition, water pipes and high-pressure nozzles are symmetrically distributed on both sides of each internally supported transmission roller, i.e., convective water flow is adopted for cooling, moreover, the component forces in the horizontal direction cancel each other out, thereby not influencing transmission of cells. At the same time, the grinding direction of the grinding wheel and/or the abrasive belt grinding member is the same as the transmission direction, thereby facilitating transmission, and there are at least two types of meshes of abrasive paper used for the abrasive belt grinding assembly, and the meshes of the abrasive paper are sequentially increased along the transmission direction, thereby effectively improving the quality of removal of a back panel through coarse grinding at one place and fine grinding at another place.

Owing to implementation of the above technical solutions, the present disclosure has the following advantages over the conventional art:

In the present disclosure, on the one hand, after on-site recycling is implemented, the cells recycled from a single photovoltaic module are about 10 g in weight, and in further consideration of the cost of moving and transporting a device once, compared with the existing centralized recycling of loaded photovoltaic module, the transportation cost will be qualitatively reduced with strong flexibility and practicality; on the other hand, through docking and articulating transfer of containers, the present disclosure is not limited by on-site levelness and height differences, once the containers are docked, recycling is performed in an on-site environment with inconsistent levelness, thereby overcoming technical barriers to on-site recycling and promoting the development of the on-site recycling technology.

DETAILED DESCRIPTION OF THE EMBODIMENTS

In order to make the above objects, features and advantages of the present disclosure more obvious and understandable, the present disclosure is described in detail below in combination with the accompanying drawings and specific embodiments. Many specific details are illustrated in the following description to facilitate a full understanding of the present disclosure. However, the present disclosure may be implemented in many other ways different from those described herein, and those skilled in the art may make similar improvements without violating the connotation of the present disclosure, therefore, the present disclosure is not limited by the specific embodiments disclosed below.

Figure 1:
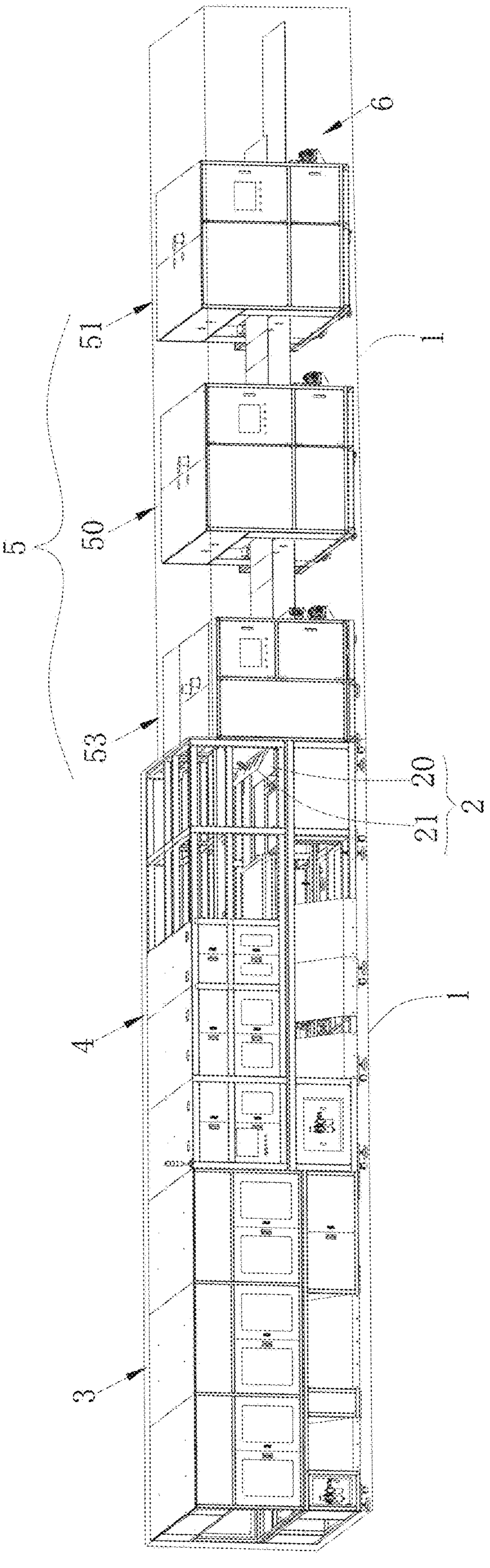
FIG. 1 is a structural schematic structure of the container-type photovoltaic module recycling device of the present disclosure.

As shown in FIG. 1, the container-type photovoltaic module recycling device involved in this embodiment includes at least two sections of containers 1 that are capable of being docked at their ends in a length direction, an articulating transfer apparatus 2 located between two adjacent containers 1, a junction box removal apparatus 3, a frame removal apparatus 4, and a glass stripping apparatus 5.

In some specific embodiments, the container 1 has two sections, the junction box removal apparatus 3 and the frame removal apparatus 4 are located in the former section of the container 1, and the glass stripping apparatus 5 is located in the latter section of the container 1, and during recycling, the two transportation trucks are aligned and spliced from the rear of the trucks, and the articulating transfer apparatus 2 eliminates the drop between the former section and the latter section and guides and transfers the photovoltaic modules, with removal of the junction box and the frame, to the glass stripping apparatus 5, wherein a material opening is formed on a side of each container 1, and the photovoltaic modules are sequentially and continuously subjected to junction box removal, frame removal, stripping pre-treatment, initial hob roller stripping, and re-eradication of residual glass through the articulating transfer apparatus 2, wherein the junction box, the frame, and the broken glass are respectively discharged from the material opening; and the cells are stored in corresponding containers 1.

Figure 2:
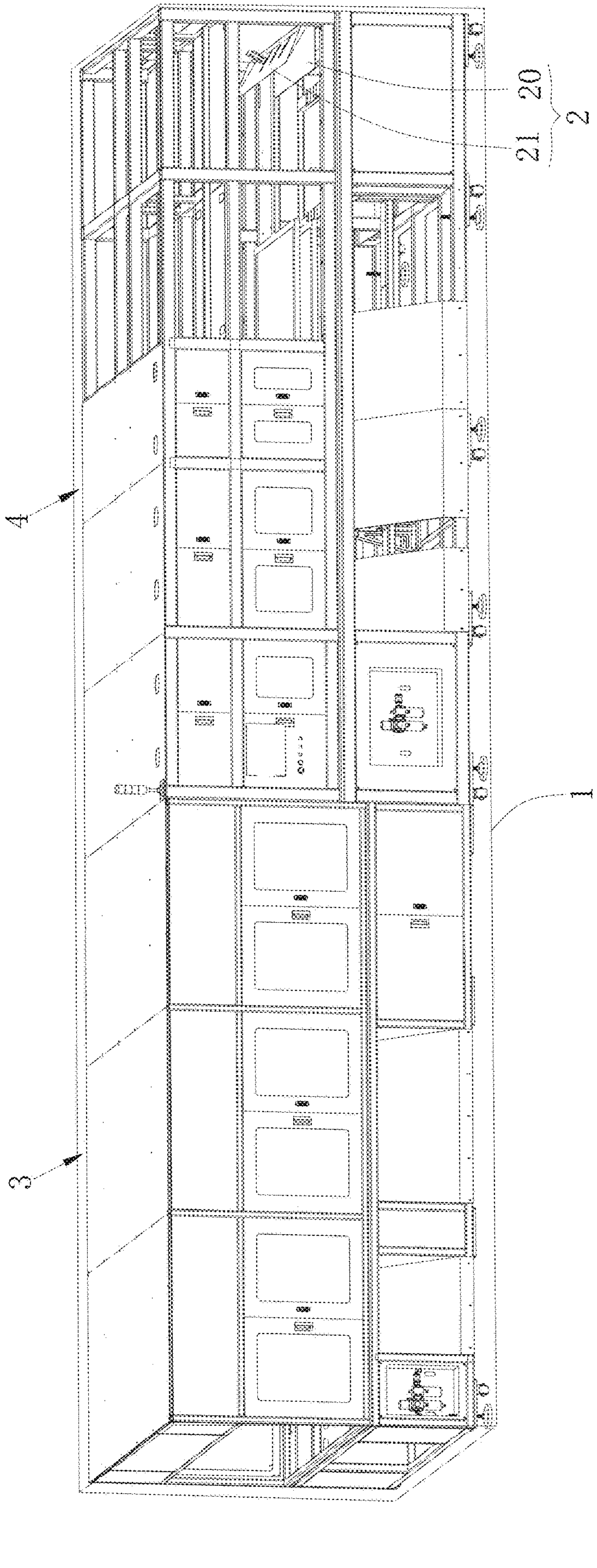
FIG. 2 is an enlarged schematic diagram of the structure of the former section of the container in FIG. 1.
Figure 3:
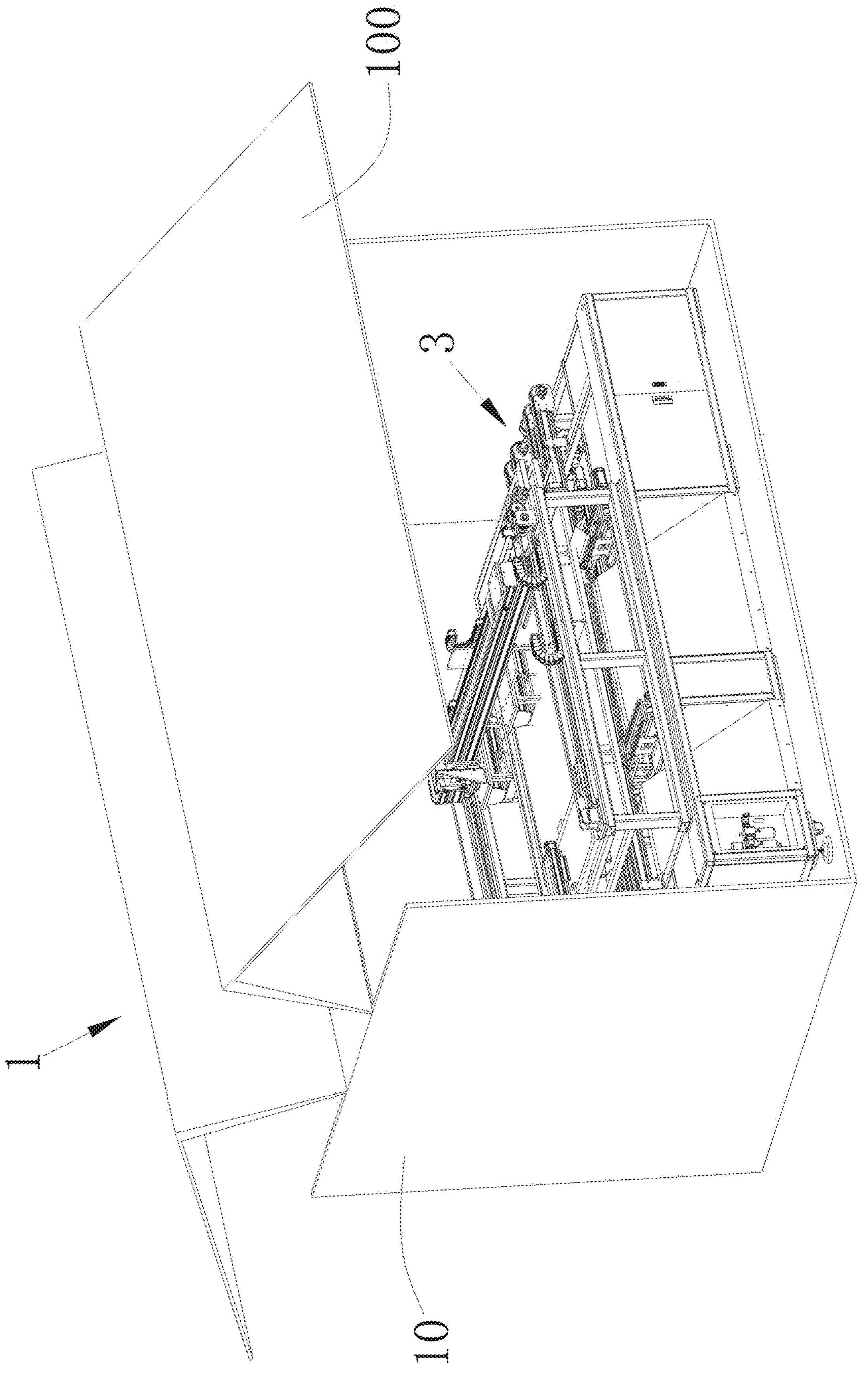
FIG. 3 is a structural schematic diagram of the compartment in which the junction box removal apparatus in FIG. 2 is located after the wing door is unfolded.
Figure 4:
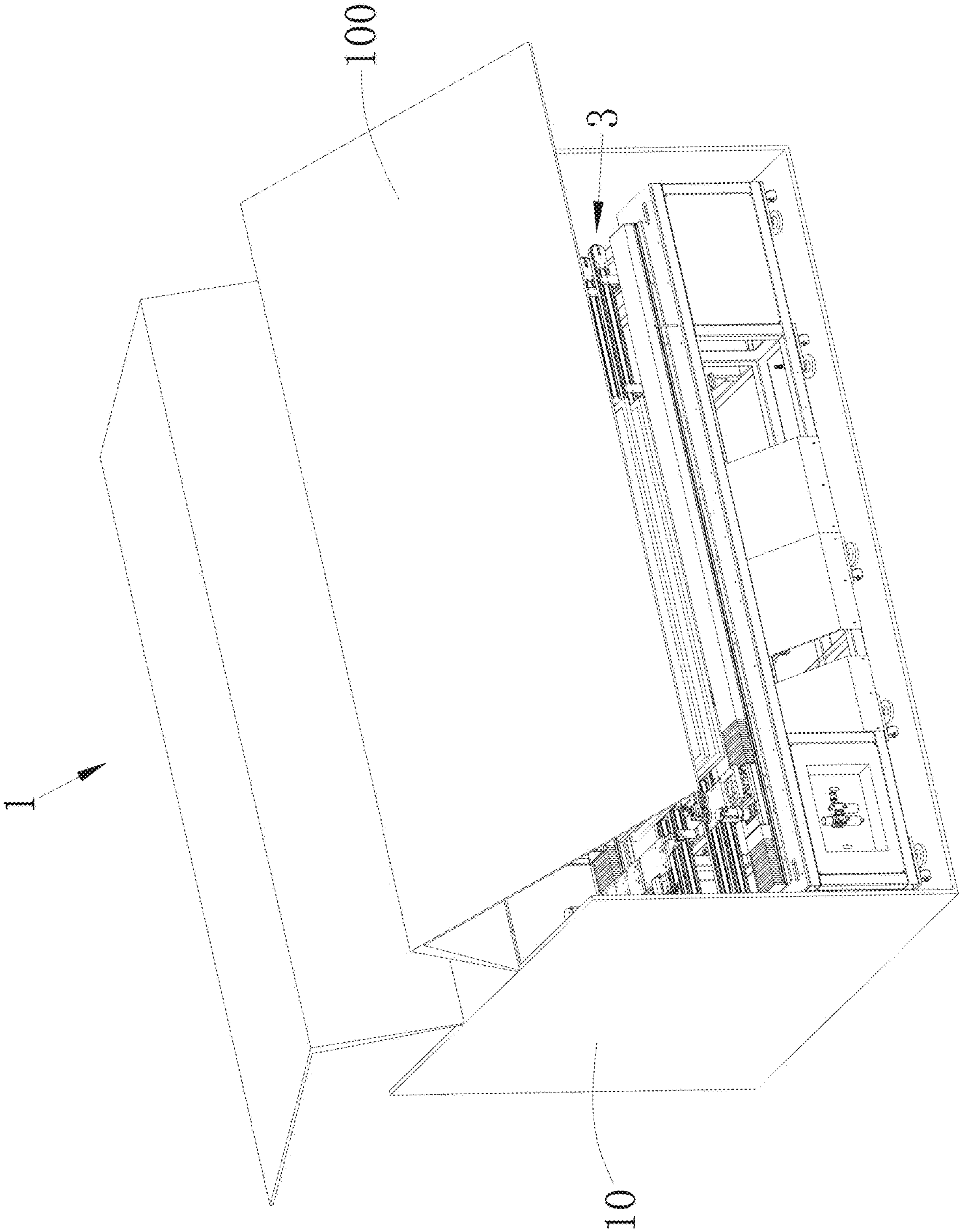
FIG. 4 is a structural schematic diagram of the compartment in which the frame removal apparatus in FIG. 2 is located after the wing door is unfolded.

As shown in FIG. 2 to FIG. 4, the former section of the container 1 has two sub-compartments 10, the junction box removal apparatus 3 and the frame removal apparatus 4 are sequentially arranged in the two sub-compartments 10, and both sides of each sub-compartment 10 are formed with unfolded or closed wing doors 100, wherein the wing doors 100 are flipped around a length direction of the container to open or close from the top of the sub-compartment 10, and a material opening is formed at two opposite sides of the wing door 100 after the wing door 100 is unfolded. The removed junction box and the frame are discharged from the material opening formed after the wing door 100 is open. At the same time, for the junction box removal apparatus 3 and the frame removal apparatus 4, please respectively refer to the patent ZL202211099557.6 entitled "Integrated Disassembly Device and Removal Method of Frame and Junction Box of Photovoltaic Module", wherein for the junction box removal apparatus 3, please refer to the junction box removal station, and for the frame removal apparatus 4, please refer to the frame removal station, and the junction box removal apparatus 3 and the frame removal apparatus 4 are not repeatedly redundantly herein, but are also clearly implementable.

Figure 5:
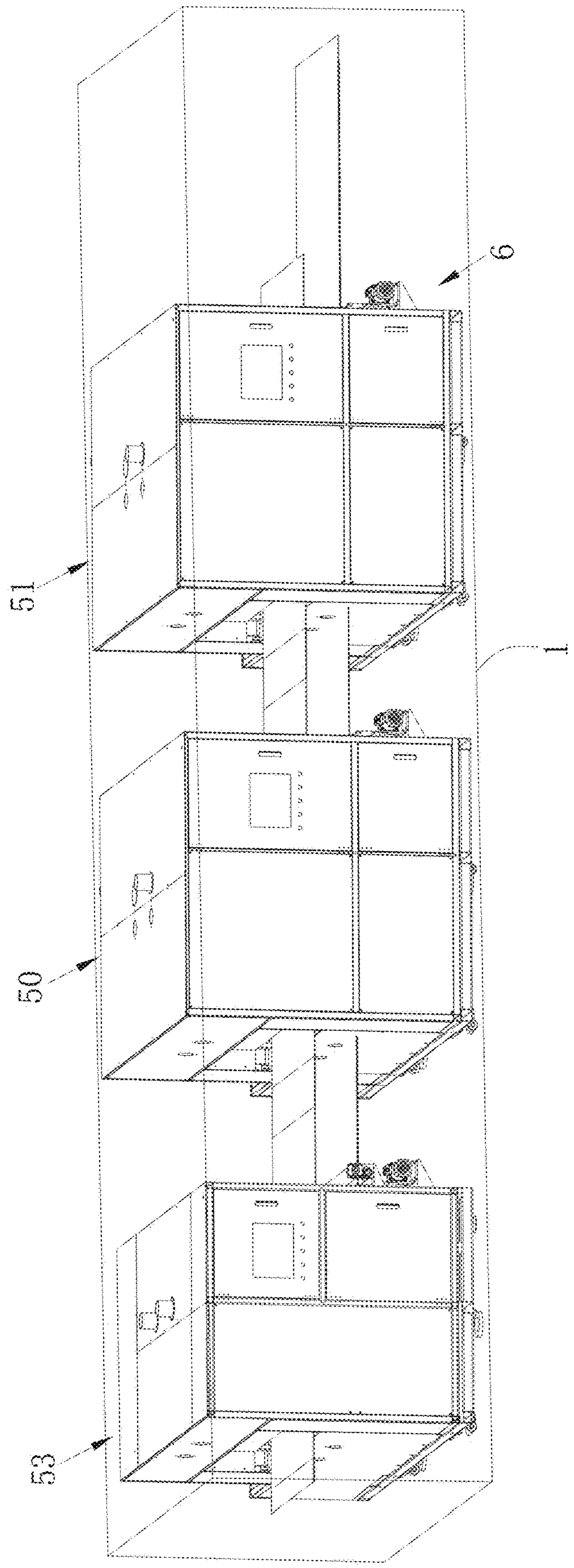
FIG. 5 is an enlarged schematic diagram of the structure of the latter section of the container in FIG. 1.
Figure 6:
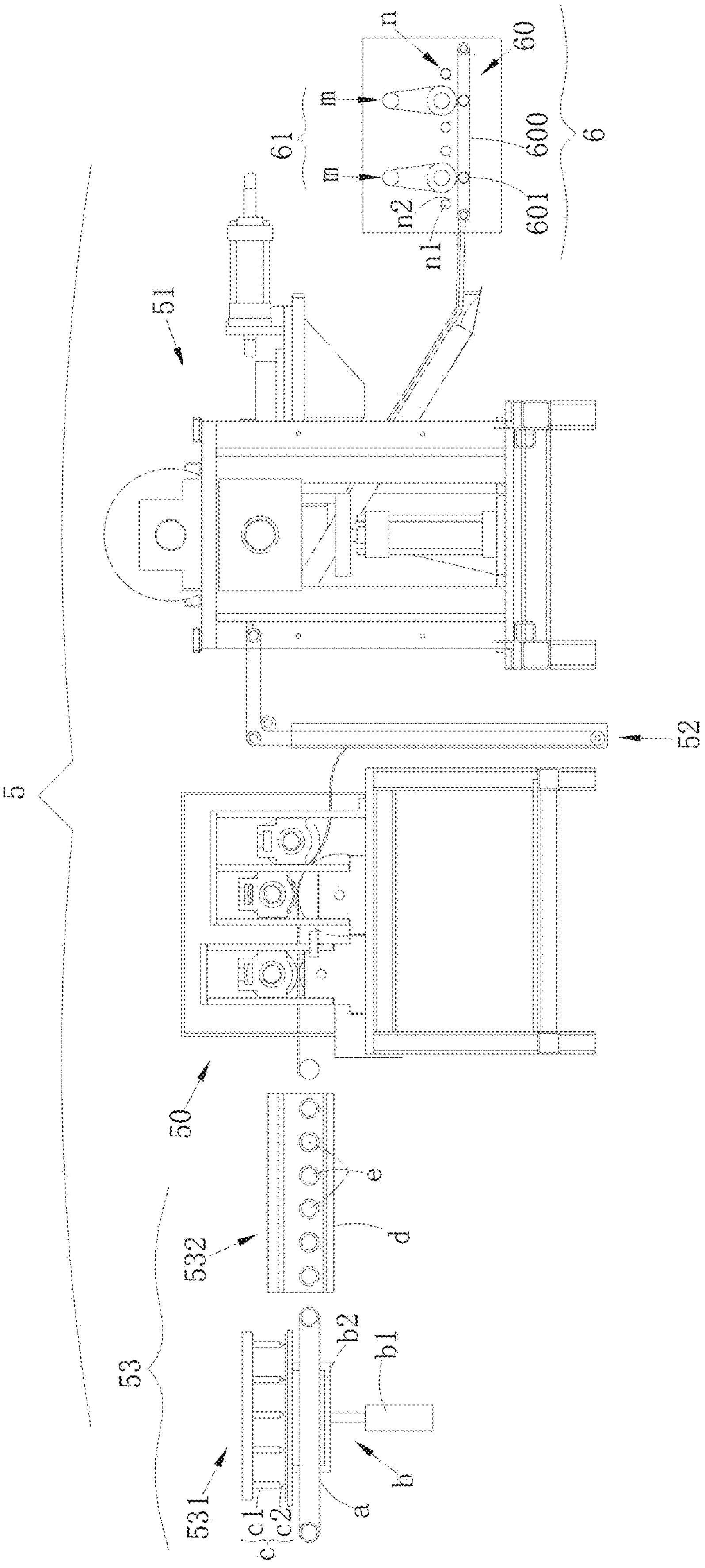
FIG. 6 is a simplified schematic diagram of the structure of FIG. 5.
Figure 7:
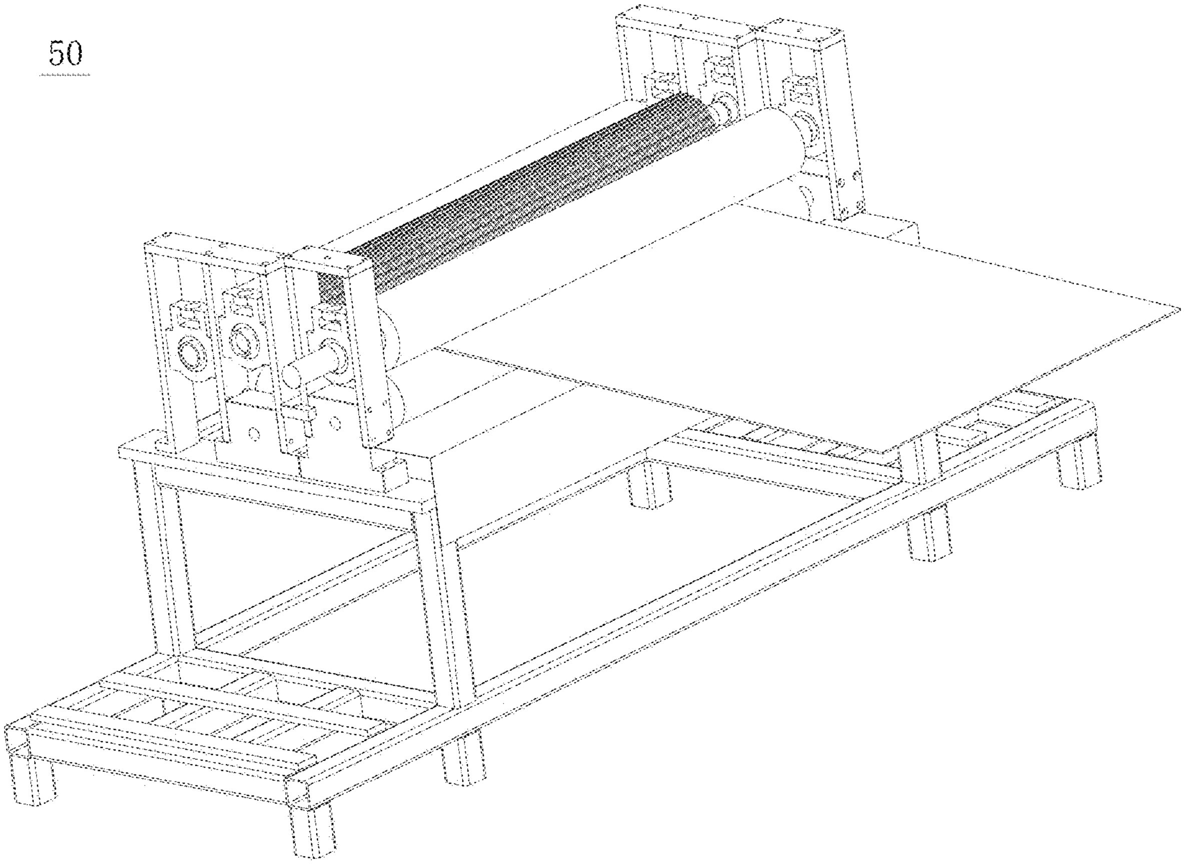
FIG. 7 is a structural schematic diagram of the initial stripping unit of FIG. 6.
Figure 8:
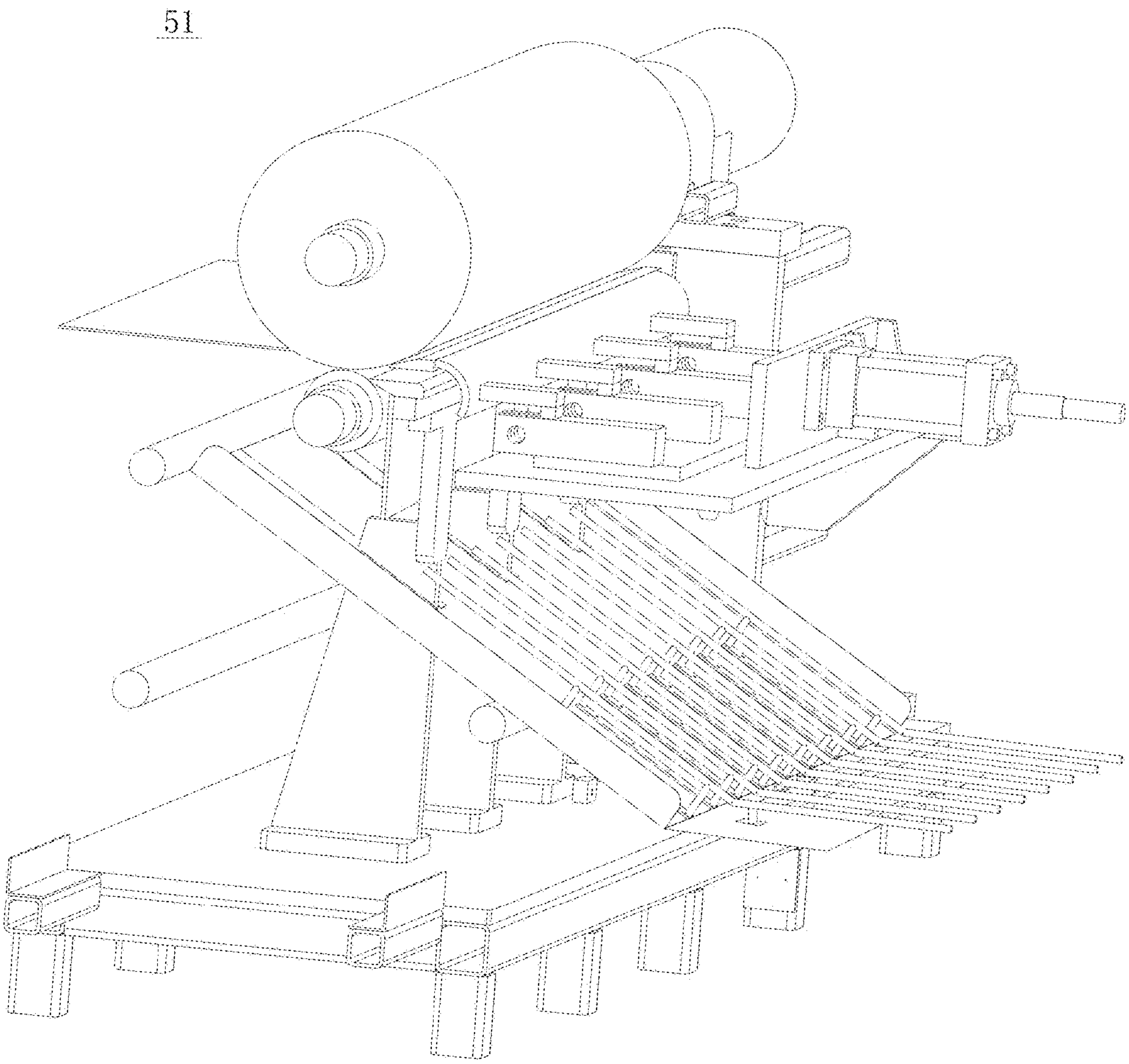
FIG. 8 is a structural schematic diagram of the re-stripping apparatus of FIG. 6.
Figure 9:
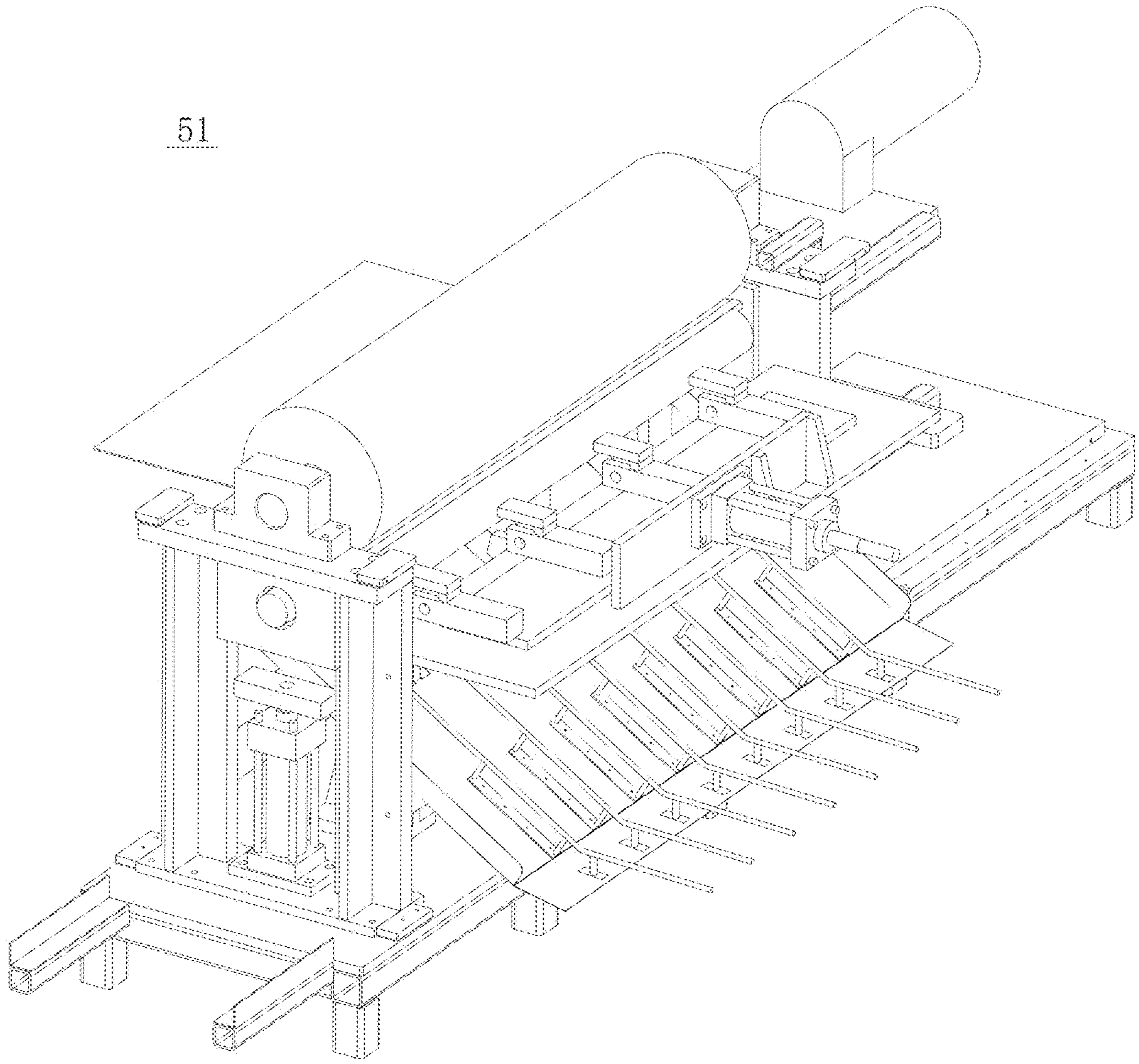
FIG. 9 is a partial structural schematic diagram of FIG. 8.

In combination with FIG. 5, the articulating transfer apparatus 2 is located at a tail section of the latter container 1, an output end of the frame removal apparatus 4 is located above an input end of the glass stripping apparatus 5, and the articulating transfer apparatus 2 includes a horizontally extending material receiving section 20, and a material guiding section 21 arranged to be inclined from top to bottom, wherein a transfer material channel which gradually becomes small from the front to the back is arranged between the material receiving section 20 and the material guiding section 21, and the material receiving section 20 and the material guiding section 21 are both annular transmission belts.

In combination with FIG. 6 to FIG. 9, the glass stripping apparatus 5 includes an initial stripping unit 50, a re-stripping unit 51, and an articulating reversing unit 52, wherein for the glass stripping apparatus 5, please refer to the patent ZL202310894070.5 entitled "Fractional Stripping, Removal and Recycling Device of Glass of Photovoltaic Module", i.e., the initial stripping apparatus corresponds to the initial stripping unit 50 of the present application; the re-stripping apparatus corresponds to the re-stripping unit 51 of the present application; and the articulating reversing apparatus corresponds to the articulating reversing unit 52 of the present application, which are not repeated redundantly herein, but are also clearly implementable. That is, the initial stripping unit 50 is capable of keeping the broken photovoltaic module to be stripped of the broken glass on the surface by the hob roller arranged above in the same slope, the re-stripping unit 51 is capable of keeping the photovoltaic module to be eradicated of residue glass at the same angle, and the articulating reversing unit 52 is used for reversing the front and back sides of the photovoltaic module and articulating the initial stripping unit with the re-stripping unit.

Referring again to FIG. 6, the glass stripping apparatus 5 further includes a stripping pre-treatment unit 53 located at a front end of the initial stripping unit 50, wherein the stripping pre-treatment unit 53 includes a stress relief mechanism 531 and a pre-heating mechanism 532, the stress relief mechanism 531 is used for glass cracking or breaking under pressure, and the stress relief mechanism 531 includes a transmission material channel a docked with a transfer material channel, a lifting member b capable of moving up and down and docking with the photovoltaic module from the transmission material channel a, and an extruding breaking head c located on the top, wherein the lifting member b is lifted upwards after docking with the photovoltaic module and breaks the upper layer of glass under an extrusion in an up and down direction formed when the glass is fit with the extruding breaking head c, in some specific embodiments, the lifting member b includes a telescopic cylinder b1 and a bearing frame b2, wherein a supporting portion of the bearing frame b2 is misaligned with the transmission material channel, such that the photovoltaic module is docked when the supporting portion emerges from a transmission surface of the transmission material channel a. A plurality of extruding breaking heads c are available, and are arranged in an array on a bottom surface of the top base panel. Each extruding breaking head c includes a fixed rod c1, and a breaking head c2 located at the bottom of the fixed rod c1, wherein the breaking head gradually narrows from top to bottom and has a spherical bottom. The resulting breaking pressure is optimal, thereby reducing the difficulty in stripping, and causing no damage to cells. The pre-heating mechanism 532 softens an adhesive layer of the glass, and the pre-heating mechanism 532 includes a heating furnace d and a heating roller e, wherein the heating roller e forms a transmission surface, and the temperature formed in the heating furnace d is 80-120° C. Generally, a temperature of 90±2° C. is sufficient. The role of preheating is to destroy the stress of the adhesive film and glass, such that the glass is easier to fall off.

In addition, in order to further facilitate subsequent processing of cells, the photovoltaic module recycling device in this embodiment further includes a back panel removal apparatus 6 docked with the re-stripping unit 51, wherein the back panel removal apparatus 6 includes a transmission unit 60, and a grinding unit 61 located above a transmission surface formed by the transmission unit 60, wherein the grinding unit 61 performs wet grinding. When a back panel is removed using wet grinding, environmental pollution and toxicity and other phenomena will not be caused by gasification of fluorine-containing components, and mixing of materials caused by back panel residues is also avoided, thereby further enhancing the purity of the recycled silicon. The grinding unit 61 includes a plurality of grinding groups 610 located above the transmission surface formed by the transmission unit 60 and arranged side by side, and each grinding group 610 includes a grinding tool m and a cooling tool n, wherein the grinding tool m is a grinding wheel and/or an abrasive belt grinding member, and the cooling tool n is cooling through water flow flushing.

In some specific embodiments, the transmission unit 60 includes an annular transmission belt assembly 600, and an internally supported transmission roller 601 located at the grinding place. In this example, grinding at two places is adopted and grinding is performed at a front and a rear part, wherein the grinding tool m is a abrasive belt grinding member, and the meshes of the abrasive paper are sequentially increased along the transmission direction, thereby effectively improving the quality of removal of a back panel through coarse grinding at one place and fine grinding at another place. Two internally supported transmission rollers 601 are available and are in one-to-one correspondence with the grinding tools m, the cooling tools n are in one-to-one correspondence with the internally supported transmission rollers 601 and are symmetrically arranged about the internally supported transmission roller 601 from front to back, wherein the cooling tool n includes a water pipe n1 located above the annular transmission belt assembly 600, high-pressure nozzles n2 distributed at intervals on the water pipe n1 along a length direction of the water pipe n1, and a cooling liquid pressurized supply member, wherein the high-pressure nozzles n2 face downwards and are inclined towards the grinding place, and a component force of the sprayed water flow in a vertical direction constitutes a downward positive pressure to fit and press the cells against the annular transmission belt assembly 600 and grind and transmit under the transmission of the annular transmission belt assembly 600. In addition, convective water flow is adopted for cooling, moreover, the component forces of the water flow in the horizontal direction cancel each other out, thereby not influencing transmission of cells. At the same time, the grinding direction of the grinding wheel and/or the abrasive belt grinding member is the same as the transmission direction, thereby facilitating transmission, and as to the grinding tool m, a grinding wheel and an abrasive belt grinding member are combined for wet grinding.

In summary, this embodiment is implemented as follows:

S1: Device Assembly

Two transportation trucks are adopted to load separately, wherein the junction box removal apparatus 3 and the frame removal apparatus 4 are loaded in one container 1, and the glass stripping apparatus 5 and the back panel removal apparatus 6 are loaded in another container 1, the two containers 1 are transported to the recycling site, and the two transportation trucks align and splice the two containers 1 in the front and rear direction from the rear of the transportation trucks.

S2: Recycling

The photovoltaic module is sent to the junction box removal apparatus 3, the junction box and back adhesive are first removed, at the same time, the removed junction box is discharged from the material opening on the side, the photovoltaic module after removal of the junction box enters the frame removal apparatus 4, a long side and a short side are respectively removed through the frame removal apparatus 4, meanwhile, the removed long side and short side are discharged from the material opening on the side, the photovoltaic module after removal of frames enters the transfer material channel and then gradually lowers down to a horizontal state and is sent to the stripping pre-treatment unit 53, afterwards, the photovoltaic module is extruded and broken by the stress relief mechanism 531, and is sent to a heating furnace of 90±2° C. for preheating to soften the back adhesive, and then the photovoltaic module after pre-treatment is sent to the glass stripping apparatus 5, the initial stripping unit 50 keeps the broken photovoltaic module to be stripped of the broken glass on the surface by the hob roller arranged above in the same slope, the articulating reversing unit 52 is used for reversing the front and back sides of the photovoltaic module and articulating the initial stripping unit with the re-stripping unit, and the re-stripping unit 51 keeps the photovoltaic module to be eradicated of residue glass at the same angle to remove glass, at this time, broken glass is discharged from a material opening on the side, meanwhile, the cells enter the back panel removal apparatus 6 from the back panel in a manner of facing upwards, the back panel is removed through wet grinding to form cells, wherein two-stage abrasive belt grinding members are adopted in wet grinding, and the number of meshes of the abrasive paper selected for the two-stage abrasive belt grinding members is increased, and then grinding and cooling are performed under downward convection formed by the high-pressure nozzles, and the cells are transmitted to a collection layer of the container 1 in combination with the annular transmission belt assembly 600, to recycle the cells.

Therefore, after the photovoltaic module recycling device is adopted, the device is assembled by way of docking of containers on site, and the photovoltaic modules are sequentially and continuously subjected to junction box removal, frame removal, stripping pre-treatment, initial hob roller stripping, and re-eradication of residual glass through the articulating transfer apparatus, wherein the junction box, the frame, and the broken glass are respectively discharged from the material opening; and the cells are stored in corresponding containers or are discharged from the material opening. Therefore, in the present disclosure, on the one hand, after on-site recycling is implemented, the cells recycled from a single photovoltaic module are about 10 g in weight, and in further consideration of the cost of moving and transporting a device once, compared with the existing centralized recycling of loaded photovoltaic module, the transportation cost will be qualitatively reduced with strong flexibility and practicality; on the other hand, through docking and articulating transfer of containers, the present disclosure is not limited by on-site levelness and height differences, once the containers are docked, recycling is performed in an on-site environment with inconsistent levelness, thereby overcoming technical barriers to on-site recycling and promoting the development of on-site recycling technology. In a third aspect, for the advantages of the junction box removal, frame removal and glass stripping, please respectively refer to patents ZL202211099557.6 and ZL202310894070.5, and such advantages are not repeated redundantly herein; in a fourth aspect, in a process of removing the glass and the back panel, stress relief treatment and preheating are combined to eliminate some of the stress, and glass is stripped in a high quality without residues during fractional stripping, thereby greatly reducing the mixing between silicon and silica (glass), also reducing the difficulty in post-processing, and ultimately effectively improving the purity of silicon in order to satisfy the requirement of recycling, meanwhile, a back panel is removed through wet grinding, the sprayed water flow is used to form a positive pressure, and the water flow is adopted for cooling, meanwhile, after convection of water flow, the component forces in the horizontal direction cancel each other out, thereby not influencing transmission of cells, causing no environmental pollution and toxicity and other phenomena by gasification of fluorine-containing components after cooling, also avoiding mixing of materials caused by back panel residues, and further improving the purity of recycled silicon.

An exhaustive description of the present disclosure above is intended to enable those familiar with the technology in this art to understand and implement the contents of the present disclosure, and not to limit the protection scope of the present disclosure, and any equivalent changes or modifications made in accordance with the spirit of the present disclosure shall all fall within the protection scope of the present disclosure.

What is claimed is:

1. A container-type photovoltaic module recycling device, comprising a junction box removal apparatus, a frame removal apparatus, and a glass stripping apparatus, wherein the glass stripping apparatus includes an initial stripping unit, a re-stripping unit, and an articulating reversing unit, wherein the glass stripping apparatus further includes a stripping pre-treatment unit located at a front end of the initial stripping unit, the stripping pre-treatment unit includes a stress relief mechanism and a pre-heating mechanism, the stress relief mechanism is used for glass cracking or breaking under pressure, and the pre-heating mechanism softens an adhesive layer of the glass; the photovoltaic module recycling device further includes at least two sections of containers that are capable of being docked at their ends in a length direction, and an articulating transfer apparatus located between two adjacent containers, the junction box removal apparatus and the frame removal apparatus are located in the same section of container, and each unit of the glass stripping apparatus is located in the remaining containers, the articulating transfer apparatus eliminates the drop between the former section and the latter section, and the articulating transfer apparatus is located at a tail section of the former container or the latter container; a material opening is formed on a side of each container, the photovoltaic modules are sequentially and continuously subjected to junction box removal, frame removal, stripping pre-treatment, initial hob roller stripping, and re-eradication of residual glass through the articulating transfer apparatus, wherein the junction box, the frame, and the broken glass are respectively discharged from the material opening; and the cells are stored in corresponding containers or are discharged from the material opening.

2. The container-type photovoltaic module recycling device according to claim 1, wherein both sides of the container are wing-shaped and flipped around a length direction of the container to open or close, the removed junction box, frame, and broken glass are discharged from one side or both sides of a corresponding container, and cells are recycled in corresponding containers.

3. The container-type photovoltaic module recycling device according to claim 1, wherein the container has two sections, the junction box removal apparatus and the frame removal apparatus are located in the former section of the container, and the glass stripping apparatus is located in the latter section of the container, and during recycling, the two transportation trucks are aligned and spliced from the rear of the trucks, and the articulating transfer apparatus guides and transfers the photovoltaic module, with removal of the junction box and the frame, to the stress relief mechanism.

4. The container-type photovoltaic module recycling device according to claim 3, wherein the former section of the container has two sub-compartments, the junction box removal apparatus and the frame removal apparatus are sequentially arranged in the two sub-compartments, and both sides of each sub-compartment are formed with unfolded or closed wing doors.

5. The container-type photovoltaic module recycling device according to claim 3, wherein an output end of the frame removal apparatus is located above an input end of the stress relief mechanism, and the articulating transfer apparatus includes a horizontally extending material receiving section, and a material guiding section arranged to be inclined from top to bottom, wherein a transfer material channel which gradually becomes small from the front to the back is arranged between the material receiving section and the material guiding section.

6. The container-type photovoltaic module recycling device according to claim 5, wherein both the material receiving section and the material guiding section are annular transmission belts.

7. The container-type photovoltaic module recycling device according to claim 1, wherein the stress relief mechanism comprises a transmission material channel docked with the transfer material channel, a lifting member capable of moving up and down and docking with the photovoltaic module from the transmission material channel, and an extruding breaking head located on the top, wherein the lifting member is lifted upwards after docking with the photovoltaic module and breaks the upper layer of glass under an extrusion in an up and down direction formed when the glass is fit with the extruding breaking head.

8. The container-type photovoltaic module recycling device according to claim 7, wherein the lifting member comprises a telescopic cylinder and a bearing frame, a supporting portion of the bearing frame is misaligned with the transmission material channel, such that the photovoltaic module is docked when the supporting portion emerges from a transmission surface of the transmission material channel.

9. The container-type photovoltaic module recycling device according to claim 7, wherein a plurality of extruding breaking heads are available, and are arranged in an array on a bottom surface of the top base panel.

10. The container-type photovoltaic module recycling device according to claim 9, wherein each extruding breaking head comprises a fixed rod, and a breaking head located at the bottom of the fixed rod, wherein the breaking head gradually narrows from top to bottom.

11. The container-type photovoltaic module recycling device according to claim 10, wherein the breaking head has a spherical bottom.

12. The container-type photovoltaic module recycling device according to claim 1, wherein the pre-heating mechanism comprises a heating furnace and a heating roller, the heating roller forms a transmission surface, and the temperature formed in the heating furnace is 80-120° C.

13. The container-type photovoltaic module recycling device according to claim 1, wherein the photovoltaic module recycling device further comprises a back panel removal apparatus docked with a re-stripping unit, the back panel removal apparatus includes a transmission unit, and a grinding unit located above a transmission surface formed by the transmission unit.

14. The container-type photovoltaic module recycling device according to claim 13, wherein the grinding unit performs wet grinding.

15. The container-type photovoltaic module recycling device according to claim 14, wherein the grinding unit comprises a plurality of grinding groups located above the transmission surface formed by the transmission unit and arranged side by side, and each grinding group includes a grinding tool and a cooling tool, wherein the grinding tool is a grinding wheel and/or an abrasive belt grinding member, and the cooling tool is cooling through water flow flushing.

16. The container-type photovoltaic module recycling device according to claim 15, wherein the transmission unit comprises an annular transmission belt assembly, and an internally supported transmission roller located at the grinding place.

17. The container-type photovoltaic module recycling device according to claim 16, wherein the cooling tool is arranged corresponding to the internally supported transmission roller, and the cooling tool includes a water pipe located above the annular transmission belt assembly, high-pressure nozzles distributed at intervals on the water pipe along a length direction of the water pipe, and a cooling liquid pressurized supply member, wherein the high-pressure nozzles face downwards and are inclined towards the grinding place, and a component force of the sprayed water flow in a vertical direction constitutes a downward positive pressure to fit and press the cells against the annular transmission belt assembly and grind and transmit under the transmission of the annular transmission belt assembly.

18. The container-type photovoltaic module recycling device according to claim 17, wherein the water pipes and high-pressure nozzles are symmetrically distributed on both sides of each internally supported transmission roller.

19. The container-type photovoltaic module recycling device according to claim 15, wherein the grinding direction of the grinding wheel and/or the abrasive belt grinding member is the same as the transmission direction, and/or, wherein there are at least two types of meshes of abrasive paper used for the abrasive belt grinding assembly.

20. The container-type photovoltaic module recycling device according to claim 19, wherein the meshes of the abrasive paper are sequentially increased along the transmission direction.

* * * * *